United States Patent
Weizman et al.

(10) Patent No.: US 11,711,738 B2
(45) Date of Patent: Jul. 25, 2023

(54) WIRELESS COMMUNICATION HANDOVER PROCEDURE

(71) Applicant: TEXAS INSTRUMENTS INCORPORATED, Dallas, TX (US)

(72) Inventors: Yaniv Weizman, Tel Aviv Jaffa (IL); Lior Gersi, Kfar Saba (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 60 days.

(21) Appl. No.: 17/318,303

(22) Filed: May 12, 2021

(65) Prior Publication Data
US 2022/0014986 A1 Jan. 13, 2022

Related U.S. Application Data

(60) Provisional application No. 63/049,383, filed on Jul. 8, 2020.

(51) Int. Cl.
*H04W 36/00* (2009.01)
*H04W 4/80* (2018.01)
*H04W 36/30* (2009.01)

(52) U.S. Cl.
CPC ....... *H04W 36/00837* (2018.08); *H04W 4/80* (2018.02); *H04W 36/0061* (2013.01); *H04W 36/30* (2013.01)

(58) Field of Classification Search
CPC ....... H04W 36/03; H04W 36/30; H04W 4/80; H04W 36/0061; H04W 36/00837; H04W 4/40; H04W 76/23
See application file for complete search history.

(56) References Cited

U.S. PATENT DOCUMENTS

| 2007/0141987 | A1 | 6/2007 | Weinans et al. |
| 2012/0100803 | A1* | 4/2012 | Suumaki ............... H04W 12/03 455/41.1 |
| 2015/0304843 | A1* | 10/2015 | Hillyard ................ G06F 8/654 726/5 |
| 2016/0286600 | A1* | 9/2016 | Faccin ................ H04W 48/16 |
| 2018/0220429 | A1 | 8/2018 | Hazebrouck et al. |

(Continued)

OTHER PUBLICATIONS

Notification of Transmittal of the International Search Report and the Written Opinion of the International Searching Authority, or Declaration; PCT/US 2021/038229; dated Sep. 16, 2021; 8 pages.

*Primary Examiner* — Awet Haile
(74) *Attorney, Agent, or Firm* — Mandy Barsilai Fernandez; Frank D. Cimino (57) ABSTRACT

A method includes communicating with a remote device using a first access node of an access network; determining, by a centralized stack node of the access network, that a quality of a first wireless communication link between the remote device and the first access node is below a threshold; identifying a second access node in the access network for which a quality of a second wireless communication link between the remote device and the second access node is above the threshold; responsive to identifying the second access node, updating, by a centralized controller of the stack node, an access node identifier associated with a connection with the remote device to be an identifier for the second access node; and communicating with the remote device using the second access node.

25 Claims, 6 Drawing Sheets

(56) References Cited

U.S. PATENT DOCUMENTS

| | | |
|---|---|---|
| 2019/0104458 A1* | 4/2019 | Svennebring ......... H04W 40/18 |
| 2020/0107235 A1 | 4/2020 | Peisa et al. |
| 2020/0221359 A1* | 7/2020 | Srivastava ............. H04W 4/80 |
| 2021/0195393 A1* | 6/2021 | Jiménez .................. H04W 4/70 |

* cited by examiner

WIRELESS COMMUNICATION HANDOVER PROCEDURE

CROSS-REFERENCE TO RELATED APPLICATIONS

The present application claims priority to U.S. Provisional Patent Application No. 63/049,383, which was filed Jul. 8, 2020, is titled "A System And Method For Optimizing Handover Procedure In A BT/BLE Mobile Networks Using Distributed Modem/RF Baseband Frontend System," and is hereby incorporated herein by reference in its entirety.

SUMMARY

In accordance with at least one example of the disclosure, a method includes communicating with a remote device using a first access node of an access network; determining, by a centralized stack node of the access network, that a quality of a first wireless communication link between the remote device and the first access node is below a threshold; identifying a second access node in the access network for which a quality of a second wireless communication link between the remote device and the second access node is above the threshold; responsive to identifying the second access node, updating, by a centralized controller of the stack node, an access node identifier associated with a connection with the remote device to be an identifier for the second access node; and communicating with the remote device using the second access node.

In accordance with another example of the disclosure, a system includes an access network configured to wirelessly communicate with a remote device. The access network includes a first access node, a second access node, and a stack node coupled to the first and second access nodes. The stack node includes a controller configured to implement a communication stack to facilitate a connection with the remote device, communicate with the remote device using a first wireless communication link between the first access node and the remote device, determine that a quality of a second wireless communication link between the remote device and the second access node is greater than a quality of the first wireless communication link, and, responsive to determining that the quality of the second wireless communication link is greater than the quality of the first wireless communication link, update an access node identifier associated with the connection with the remote device to be an identifier for the second access node. The controller is then configured to communicate with the remote device using the second access node.

In accordance with yet another example of the disclosure, a device includes a first integrated node having a first access node and a stack node coupled to the first access node. The stack node is configured to implement a communication stack to facilitate a connection with a remote device, determine that a quality of a first wireless communication link between the remote device and the first access node is below a threshold, identify a second access node in another integrated node for which a quality of a second wireless communication link between the remote device and the second access node is above the threshold, and, responsive to identifying the second access node, update an access node identifier associated with a connection with the remote device to be an identifier for the second access node. The communication stack is the configured to communicate with the remote device using the second access node.

BRIEF DESCRIPTION OF THE DRAWINGS

For a detailed description of various examples, reference will now be made to the accompanying drawings in which.

DETAILED DESCRIPTION

Bluetooth (BT) and Bluetooth Low Energy (BLE) are communication protocol standards that facilitate wireless data transmission over a radio link. A BLE access network includes multiple BLE access nodes. The multiple BLE access nodes are seen as a single logical entity by a device that connects to the BLE access network. For example, the device that connects to the BLE access network does so using a same device address regardless of the one of the BLE access nodes to which the device connects. In one example, a BLE access network is used in a vehicular access application. Multiple BLE access nodes are deployed around the vehicle to enable the maintenance and management of continuous BT/BLE connectivity to a BT/BLE-enabled remote device, such as a user's mobile device.

A handover (e.g., a BLE handover) is a procedure of updating or changing from a first wireless communication link between the remote device and a first access node to a second wireless communication link between the remote device and a second access node. The handover from the first wireless communication link (e.g., at the link layer) to the second wireless communication link is performed without reestablishing a new connection (e.g., terminating the existing connection and subsequently establishing the new connection). A BLE handover is performed responsive to a determination that the first wireless communication link has a link quality below a threshold, and that the second wireless communication link will provide a link quality greater than that of the first wireless communication link. Thus, it is useful to provide an improved or best-possible wireless link between the remote device and an access node of the BLE access network. However, there is no handover procedure in the BLE specification.

One handover procedure in another wireless communication context (e.g., in cellular networks) is enabled by configuring each access node to implement an instance of a communication stack. When a remote device should change access nodes, an inter-stack handover occurs from a current communication stack instance (e.g., on the current, soon-to-be previous access node) to a new communication stack instance (e.g., on the new access node). The inter-stack handover requires each access node to be capable of providing a full communication stack instance, which increases access node complexity. The inter-stack handover also takes a relatively long time and uses complex inter-stack control procedures and communications. Finally, it is difficult to properly handover timing and/or synchronization information using the inter-stack handover, and such timing and/or synchronization information is useful in BT/BLE wireless communication applications.

Examples of this description address the foregoing by providing a communication stack (e.g., a BLE stack) implemented on a centralized stack node of an access network (e.g., a BLE access network). In some examples, the stack node implements a centralized host and a centralized controller. In these examples, the controller provides link layer functionality and the host provides higher-layer functionality, such as security management, access profile management, and the like. In certain examples, the functionality provided by the controller and the host is as specified in the BLE specification, and thus the controller is a BLE controller and the host is a BLE host.

The centralized stack node is coupled to a plurality of access nodes (e.g., radio frequency (RF) frontends that provide physical layer functionality) of the access network, and is configured to communicate with the remote device through one of the access nodes. In some examples, the RF frontends implement or provide modem and physical RF communication functionality. In an example, the centralized stack node, and/or the current access node used for communicating with the remote device, determines that a link quality is below a threshold, which indicates that the stack node should search for a different access node (e.g., a next access node having a greater link quality than the current access node) to communicate with the remote device.

Responsive to the stack node identifying a suitable next access node, the controller initiates a handover procedure to the next access node. In one example, the controller assigns the next access node to serve the existing connection between the communication stack implemented by the stack node (e.g., down to the link layer implemented by the controller of the stack node) and the remote device. For example, the stack node (e.g., the host or the controller of the stack node) maintains a service table that associates the connection to the remote device with a particular access node (e.g., using a unique RF frontend ID for that access node). The controller assigns the next access node to serve the connection by updating the RF frontend ID associated with the connection from the previous access node RF frontend ID to the next access node RF frontend ID. Link layer connection state context data is maintained in the centralized stack through the transition from serving the connection with one access node to serving the connection with the next access node.

Figure 1:
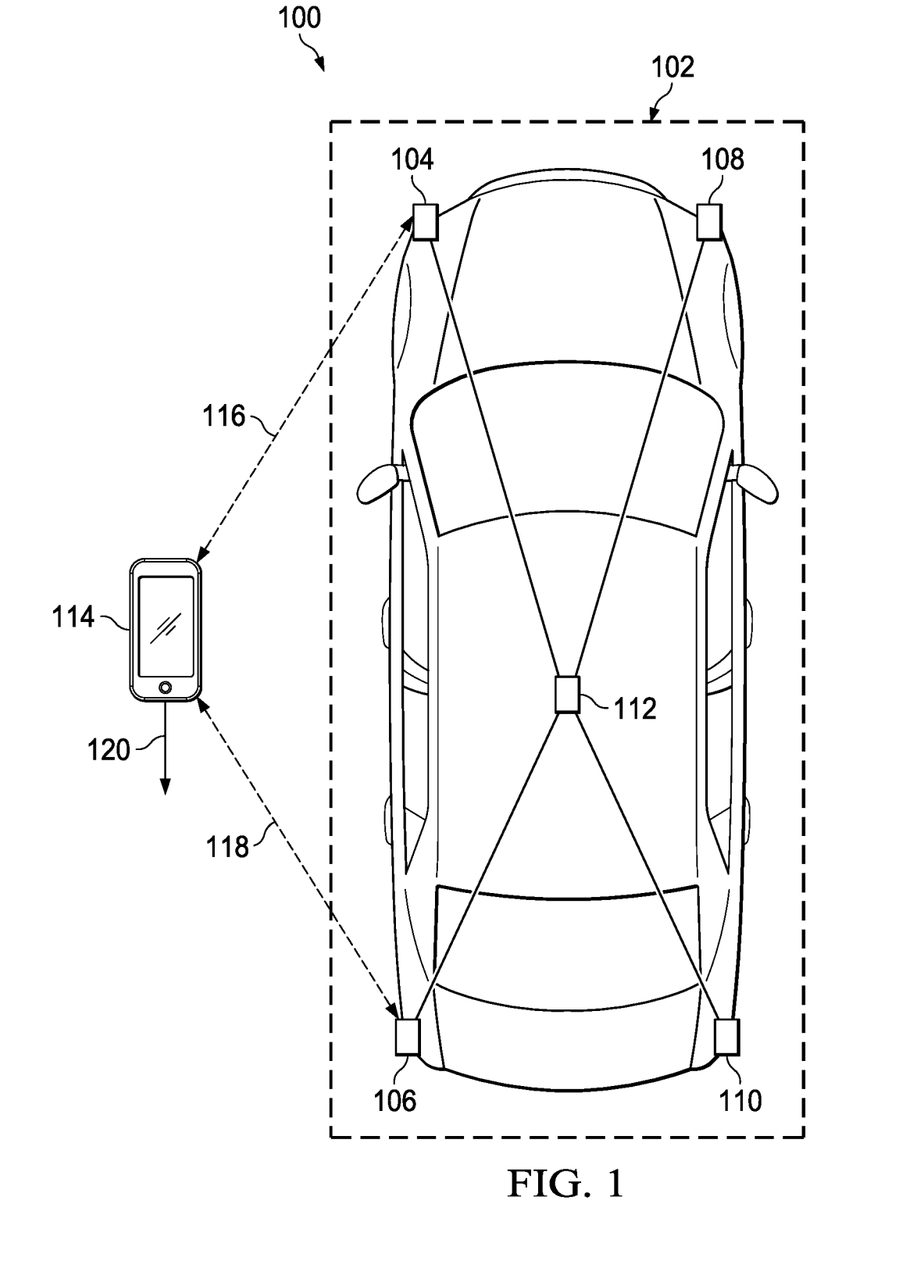
FIG. 1 is a schematic diagram of a system for wireless communication handover in accordance with various examples.

FIG. 1 is a schematic diagram of a system 100 for wireless communication handover in accordance with examples of this description. The system 100 includes an access network 102, which is depicted as part of a vehicular access application in the example of FIG. 1. The access network 102 includes multiple access nodes 104, 106, 108, 110. Although the access network 102 is shown as including four access nodes 104-110, the access network 102 includes more or fewer access nodes in other examples. As described above, in some examples the access network 102 is a BLE access network 102 and the access nodes 104-110 are BLE access nodes 104-110. The access network 102 also includes a centralized stack node 112, which is coupled to each of the BLE access nodes 104-110. As described above, the stack node 112 is configured to provide a communication stack (e.g., a BLE stack). In some examples, the stack node 112 implements a centralized host and a centralized controller. In these examples, the controller provides link layer functionality and the host provides higher-layer functionality, such as security management, access profile management, and the like. In some examples, the stack node 112 is coupled to, but physically separate from, each of the access nodes 104-110. However, in other examples, the stack node 112 is integrated with or embedded to one of the access nodes 104-110.

The system 100 also includes a remote device 114, such as a user's mobile device. In this example, the remote device 114 is a vehicle key and the access network 102 is part of a vehicle. When a user possessing the remote device 114 is within a certain proximity to the vehicle access network 102, the user is permitted to lock or unlock the vehicle, start or stop a motor of the vehicle, or otherwise alter a configuration of the vehicle. Thus, the multiple BLE access nodes 104-110 are deployed around the vehicle to enable the maintenance and management of continuous BT/BLE connectivity to the user's remote device 114 functioning as the vehicle key.

The remote device 114 is configured to communicate with the access network 102 (e.g., communicate with the communication stack implemented by the stack node 112) via a wireless communication link between the remote device 114 and one of the access nodes 104-110 of the access network 102. As described above, the access nodes 104-110 are RF frontends that implement or provide modem and physical RF communication functionality for the communication stack implemented by the stack node 112 of the access network 102.

For example, at a first time, the remote device 114 communicates with the access node 104 via a first wireless communication link 116. Subsequently, a handover is performed and the remote device 114 communicates with the access node 106 of the access network 102 via a second wireless communication link 118. In one example, the handover is performed responsive to the remote device 114 physically moving in the direction indicated by arrow 120 (e.g., further away from the access node 104 and closer to the access node 106), which causes a decrease in the link quality of the first wireless communication link 116. Continuing this example, as a result of the remote device 114 moving physically closer to the access node 106 and farther away from the access node 104, a quality of the second wireless communication link 118 is greater than a quality of the first wireless communication link 116. However, in other examples, the quality of the first wireless communication link 116 decreases for other reasons than physical separation between the remote device 114 and the access node 104. Regardless of the reason for decrease in quality of the first wireless communication link 116, the handover is performed to improve a quality of wireless communication link between the remote device 114 and the access network 102.

Figure 2:
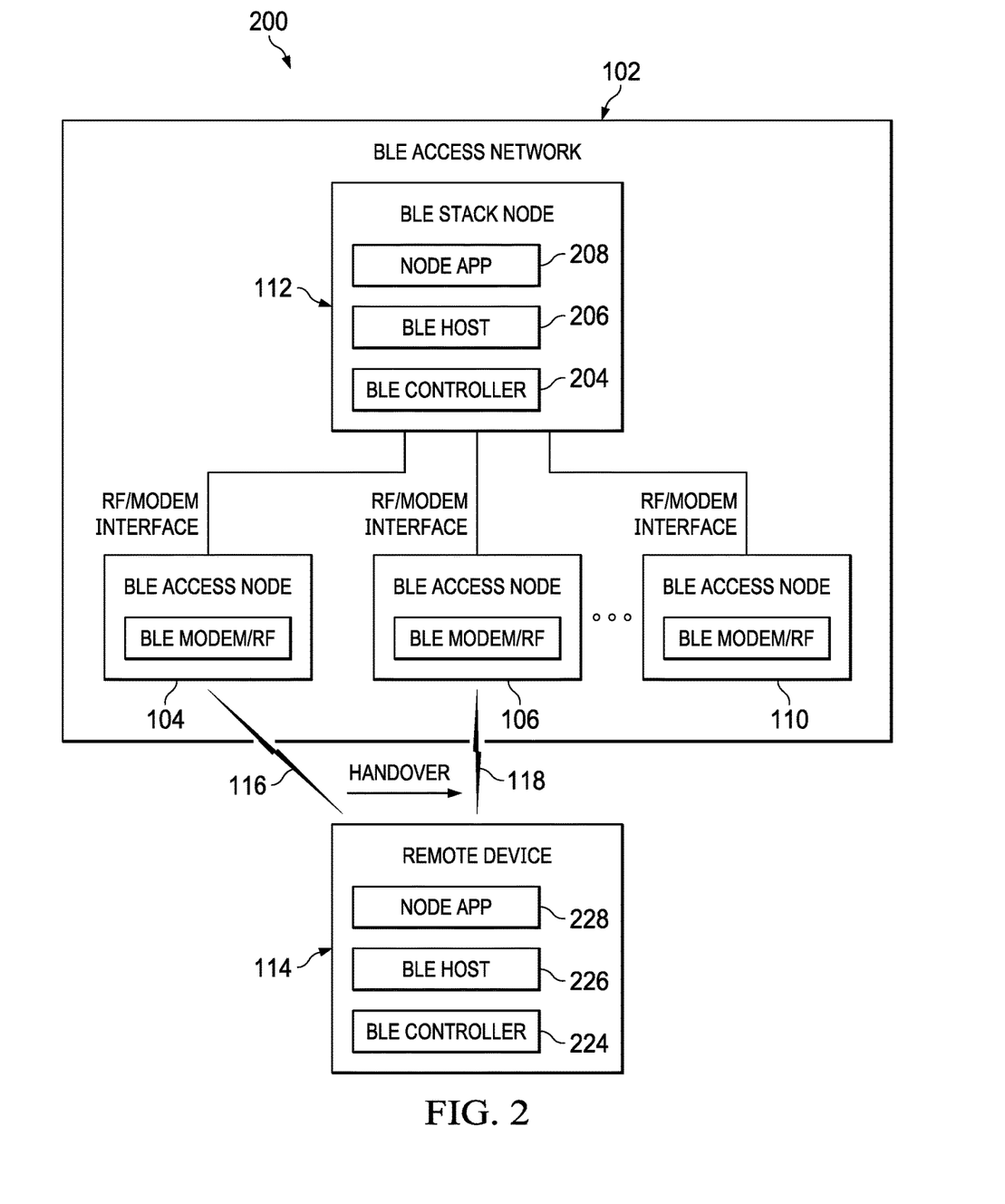
FIG. 2 is a block diagram of a system for wireless communication handover in accordance with various examples.

FIG. 2 is a block diagram of a system 200 for wireless communication handover in accordance with examples of this description. The system 200 contains certain elements that are also in the system 100, described above. For example, the system 200 includes the BLE access network 102 and its multiple access nodes 104-110. The system 200 also includes the remote device 114, which is configured to form various wireless communication links with the access nodes 104-110 of the BLE access network 102, such as the first wireless communication link 116 with the access node 104 or the second wireless communication link 118 with the access node 106.

In the example of FIG. 2, the BLE access network 102 includes the BLE stack node 112. As described above, the BLE stack node 112 may be either physically separate from the access nodes 104-110 or integrated with one of the access nodes 104-110. As described above, the BLE stack node 112 is configured to implement a corresponding BLE controller 204, a BLE host 206, and a node app 208. In this example, the BLE controller 204 is configured to provide link layer functionality, including packet scheduling, encryption, packet retransmissions, fragmentation and reassembly, and the like. The BLE host 206 is configured to provide higher-layer functionality, including Generic Access Profile (GAP), Generic Attribute Profile (GATT), Logical Link Control and Adaptation Protocol (L2CAP), Attribute Protocol (ATT), and Security Manager (SM). Finally, the node app 208 represents application behavior and is configured to control the BLE communication stack functionality that is implemented by the BLE host 206, the BLE controller 204, and the BLE access nodes 104-110. The remote device 114 also implements a corresponding BLE controller 224, a BLE host 226, and a node app 228. The BLE controller 224, BLE host 226, and node app 228 perform functions similar to the BLE controller 204, BLE host 206, and node app 208 of the BLE stack node 112, but from the perspective of the remote device 114.

The BLE controller 204 and the BLE host 206 of the BLE stack node 112 provide a communication stack (e.g., a BLE stack) that enables the node app 208 to communicate with the remote device 114 (e.g., communicate with the corresponding node app 228 of the remote device 114) via one of the access nodes 104-110 and a wireless communication link, such as the wireless communication links 116, 118. As described above, the access nodes 104-110 are RF frontends that implement or provide modem and physical RF communication functionality for the communication stack of the BLE stack node 112. However, the access nodes 104-110 do not implement a BLE stack of their own. Further, in the example in which the BLE stack node 112 is integrated with one of the access nodes 104, the BLE stack node 112 and the access node 104 are logically separate. Thus, in the integrated BLE stack node 112 example, the BLE stack node 112 implements the BLE stack while the access node 104 does not implement the BLE stack but does provide modem and physical RF communication functionality for the BLE stack implemented by the BLE stack node 112.

The controller 204 of the BLE stack node 112, and/or a current access node (e.g., access node 104) used for communicating with the remote device 114, is configured to determine that a link quality is less than a threshold, which indicates that the BLE stack node 112 should search for, or attempt to identify, a different access node (e.g., a next access node, such as access node 106, that has a greater link quality than the current access node 104) to communicate with the remote device 114. Responsive to the BLE stack node 112 identifying a suitable next access node 106, the BLE controller 204 initiates a handover procedure from the current access node 104 to the next access node 106. The handover procedure is described further below, and is transparent to the BLE host 206 and the node app 208 because the handover procedure is implemented by the BLE controller 204 in connection with the access nodes 104-110.

In an example, during a first time period, the BLE stack node 112 communicates with the remote device 114 using a first or current access node, such as the access node 104, as an RF frontend. Thus, the BLE stack node 112 communicates with the remote device 114 over the first wireless communication link 116 formed between the first access node 104 and the remote device 114.

Subsequently, the BLE stack node 112 determines that a link quality of the first wireless communication link 116 is less than a link quality threshold. In one example, the link quality is indicated by a received signal strength indicator (RSSI) value of the first wireless communication link 116. In some examples, the RSSI value is measured by the first access node 104 and provided to the BLE stack node 112, while in other examples, the RSSI value is measured by the BLE stack node 112 based on signals or other information provided by the first access node 104 to the BLE stack node 112. In another example, the link quality is indicated by Signal to Interference and Noise level (SINR). In some examples, the SINR is measured by the first access node 104 and provided to the BLE stack node 112, while in other examples, the SINR is measured by the BLE stack node 112 based on signals or other information provided by the first access node 104 to the BLE stack node 112.

Regardless of how the link quality is assessed, in some examples, the first access node 104 determines that the link quality is less than the link quality threshold. In these examples, the first access node 104 is configured to compare a link quality value to a threshold value and provide an indication of such determination to the BLE controller 204 of the BLE stack node 112. This reduces the communication bandwidth between the first access node 104 and the BLE stack node 112 by only communicating the result of the first access node 104 determination of link quality, rather than underlying data (e.g., communication signal data) used to determine the link quality value, to the BLE stack node 112. In other examples, the first access node 104 provides the communication signal data to the BLE stack node 112 and the BLE stack node 112 is configured to compare the link quality value to the threshold value in order to determine whether the link quality is less than the link quality threshold.

Responsive to the BLE stack node 112 determining that the link quality of the first wireless communication link 116 is less than the link quality threshold, the BLE stack node 112 attempts to identify a different access node (e.g., a next access node, such as access node 106) that has a greater link quality than the current access node 104 to communicate with the remote device 114.

In one example, the BLE controller 204 is configured to send a candidate search message to the remote device 114 (e.g., using the current access node 104). Responsive to receiving the candidate search message, the remote device 114 is configured to determine a parameter for each of the access nodes 104-110. The parameter for a particular access node 104-110 indicates a link quality between the remote device 114 and that particular access node 104-110. The remote device 114 is configured to provide a candidate search response message to the BLE controller 204 that contains the parameter(s) for the access nodes 104-110 (e.g., indications of link qualities for the access nodes 104-110 as observed by the remote device 114). The BLE stack node 112 is configured to identify the next access node responsive to the parameters in the candidate search response message from the remote device 114. For example, the next access node is one of the access nodes 106-110 that has a greater link quality (e.g., a link quality above the link quality threshold) with the remote device 114 than the current access node 104. In another example, the next access node is one of the access nodes 106-110 that has a link quality with the remote device 114 that is at least a threshold amount greater than the current access node 104.

In another example, the access nodes 106-110 other than the current access node 104 listen to communication between the current access node 104 and the remote device 114. The access nodes 106-110 are each configured to determine a link quality between themselves and the remote device 114 based on listening to the communications between the current access node 104 and the remote device 114. The access nodes 106-110 are thus configured to provide periodic indications of the link quality between themselves and the remote device 114 to the BLE stack node 112. The BLE stack node 112 is configured to identify the next access node responsive to the periodic indications received from the access nodes 106-110 other than the current access node 104. For example, the next access node is one of the access nodes 106-110 that has a greater link quality (e.g., a link quality above the link quality threshold) with the remote device 114 than the current access node 104. In another example, the next access node is one of the access nodes 106-110 that has a link quality with the remote device 114 that is at least a threshold amount greater than the current access node 104.

In the example of FIG. 2, regardless of how the next access node is identified, the BLE stack node 112 identifies the access node 106 as the next access node. Responsive to the BLE stack node 112 identifying the next access node 106, the BLE controller 204 is configured to update an access node identifier associated with a connection with the remote device 114. In these examples, connection refers to a connection between higher-level layers of the BLE communication stack implemented by the BLE stack node 112 and the remote device 114. For example, the connection between the remote device 114 and the node app 208, the BLE host 206, and/or the BLE controller 204 is the same regardless of the access node 104-110 being used to provide RF frontend and/or modem functionality for communicating with the remote device 114.

In one example, the BLE controller 204 maintains a service table that associates the connection between the BLE stack node 112 and the remote device 114 with a particular access node (e.g., using a unique RF frontend identifier (ID) for that access node). In one example, the service table is stored in a memory of the stack node 112. The BLE controller 204 is configured to assign the next access node 106 to serve the connection by updating the service table. For example, the BLE controller 204 updates the RF frontend ID associated with the connection in the service table from the RF frontend ID for the previous access node 104 to the RF frontend ID for the next access node 106. Subsequently, communication between the BLE stack node 112 and the remote device 114 is via the access node 106 and the second wireless communication link 118. Link layer connection state context data is maintained in the centralized stack (rather than being provided to a new stack, as in the inter-stack handover described above) through the transition from serving the connection with one access node 104 to serving the connection with the next access node 106.

In some examples, the BLE controller 204 sends transmit (TX) and receive (RX) commands to the access node 104-110 that the service table specifies is associated with the connection with the remote device 114. A TX command includes data to be transmitted by the specified access node 104-110 (e.g., to the remote device 114). A RX command instructs the specified access node 104-110 to receive a data packet (e.g., from the remote device 114) and provide the received data packet to the controller 204 of the BLE stack node 112.

In this example, when the BLE controller 204 transmits a data packet (e.g., including actual data to be transmitted, or control information) to the remote device 114, a TX command including the data packet is provided to the access node indicated by the RF frontend ID in the service table for the connection with the remote device 114. Thus, prior to the BLE controller 204 updating the RF frontend ID in the service table, data packets are provided to the access node 104 for transmission to the remote device 114 via the first wireless communication link 116. Subsequent to the BLE controller 204 updating the RF frontend ID in the service table, data packets are provided to the access node 106 for transmission to the remote device 114 via the second wireless communication link 118. The transition from the BLE stack node 112 communicating with the remote device 114 using the access node 104 to the BLE stack node 112 communicating with the remote device 114 using the access node 106 is thus transparent to the remote device 114.

Similarly, when the BLE controller 204 receives a data packet from the remote device 114, a RX command is provided to the access node indicated by the RF frontend ID in the service table for the connection with the remote device 114. Thus, prior to the BLE controller 204 updating the RF frontend ID in the service table, data packets are received from the remote device 114 by the access node 104 via the first wireless communication link 116. Subsequent to the BLE controller 204 updating the RF frontend ID in the service table, data packets are received from the remote device 114 by the access node 106 via the second wireless communication link 118. The transition from the BLE stack node 112 communicating with the remote device 114 using the access node 104 to the BLE stack node 112 communicating with the remote device 114 using the access node 106 is thus transparent to the remote device 114.

Figure 3:
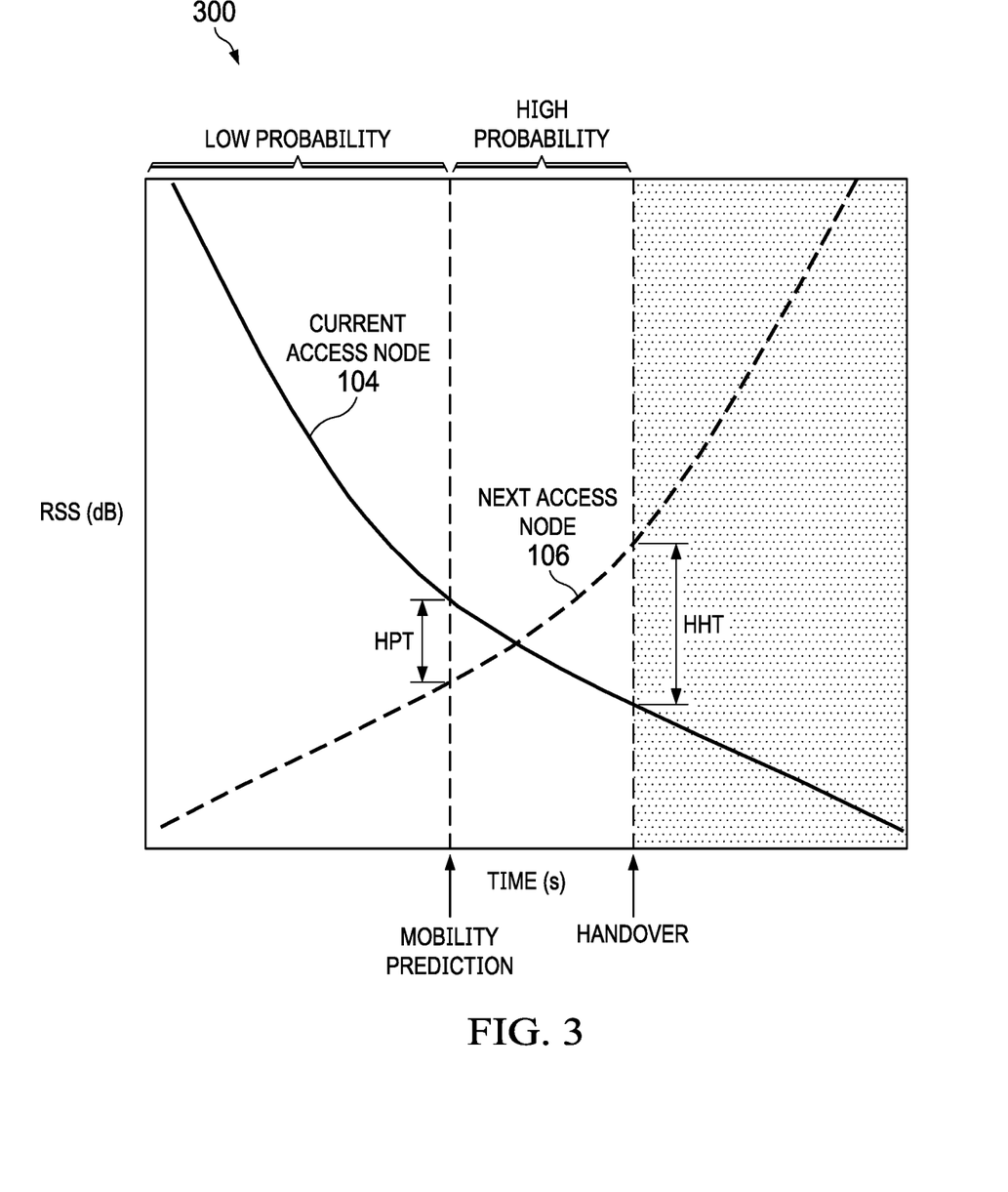
FIG. 3 is a graph of wireless communication link signal strength as a function of time associated with a wireless communication handover in accordance with various examples.

FIG. 3 is a graph 300 of wireless communication link signal strength as a function of time. In the example of FIG. 3, the graph 300 is more particularly of RSSI measured in decibels (dB) as a function of time. The graph 300 demonstrates the RSSI between the current access node (e.g., access node 104) and the remote device 114, as well as the RSSI between the next access node (e.g., access node 106) and the remote device 114.

In the graph 300, prior to the time indicated by a hysteresis prediction threshold (HPT), the link quality between access node 104 and the remote device 114 is decreasing. At a point in time where the access node 104 drops less than a link quality threshold (e.g., at a time indicated by the "mobility prediction" label in FIG. 3), a search begins for a candidate access node demonstrating improved link quality with the remote device 114. In the graph 300, the link quality between the access node 106 and the remote device 114 is increasing, which makes the access node 106 an optional candidate node for a link handover. However, there is still a relatively low probability that a handover from the access node 104 to the access node 106 would be successful, such as because the access node 106 link quality is farther below the access node 104 link quality.

In the graph 300, after the time indicated HPT, there is a high probability that a handover from the access node 104 to the access node 106 would be successful, such as because the access node 106 link quality is closer to the access node 104 link quality, and is likely to increase above the access node 104 link quality based on the trends of the link qualities.

In the example of FIG. 3, a handover occurs at the time indicated by hysteresis handover threshold (HHT), when the access node 106 link quality is greater than the access node 104 link quality, and the trend of the access node 106 link quality is increasing.

Figure 4A:
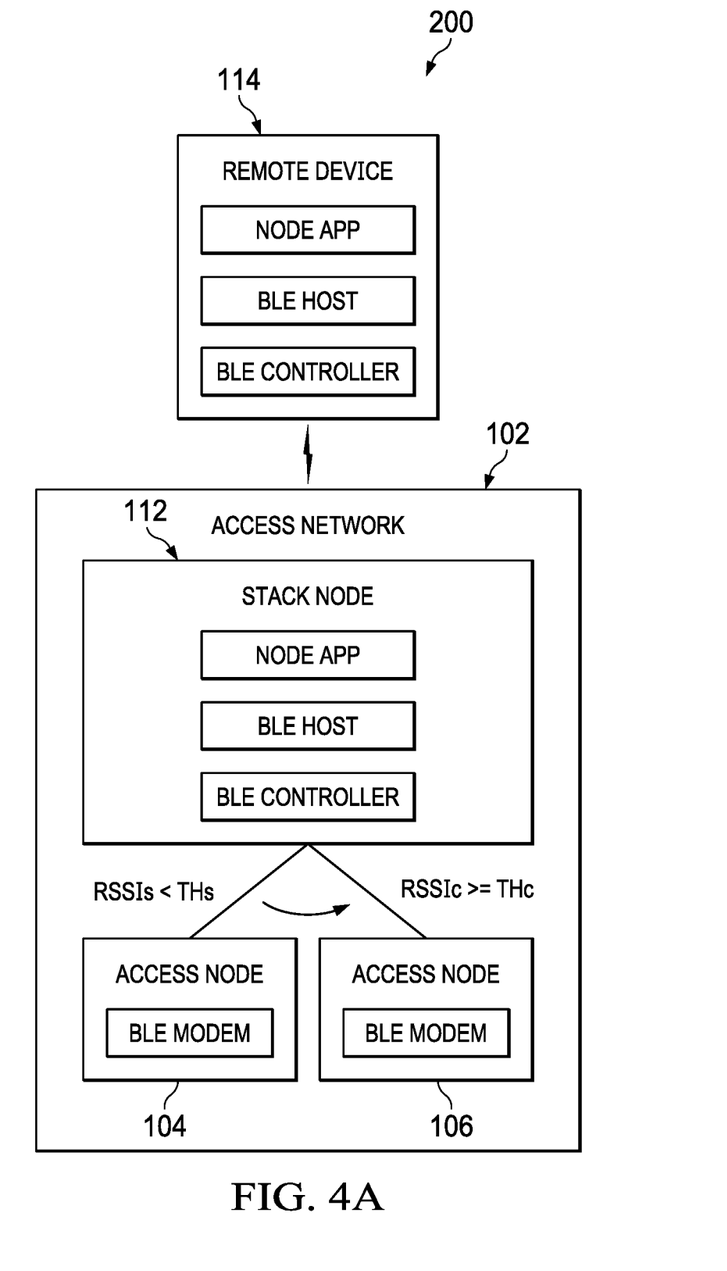
FIGS. 4A and 4B are block diagrams of systems for wireless communication handover in accordance with various examples.

FIG. 4A is a simplified block diagram of the system 200 shown in and described above with respect to FIG. 2. For example, in FIG. 4A, the system 200 includes the BLE access network 102 and access nodes 104, 106. The system 200 also includes the remote device 114, which is configured to form various wireless communication links with the access nodes 104, 106. In the example of FIG. 4A, the BLE access network 102 also includes the BLE stack node 112. As described above, the BLE stack node 112 may be either physically separate from the access nodes 104, 106 or integrated with one of the access nodes 104, 106.

In the example of FIG. 4A, it is determined that a link quality is less than a threshold, such as when the RSSI for the access node 104 is less than a serving node threshold (THs). In this example, the access node 106 is identified as a next access node to communicate with the remote device 114, because the RSSI for the access node 106 is greater than a candidate node threshold (THc). Responsive to the controller 204 of the stack node 112 identifying a suitable next access node 106, the controller 204 initiates a handover procedure from the current access node 104 to the next access node 106, as described above.

In the example of FIG. 4A, communication between the stack node 112 and each of the access nodes 104, 106 consumes bandwidth of the access network 102, which includes an automotive network in some examples. In some examples, it is useful to reduce the bandwidth of the automotive/access network 102 consumed by communication between the stack node 112 and the access nodes 104, 106, while still facilitating handover from one access node 104 to another access node 106 without the additional time and complexity introduced by an inter-stack handover.

Figure 4B:
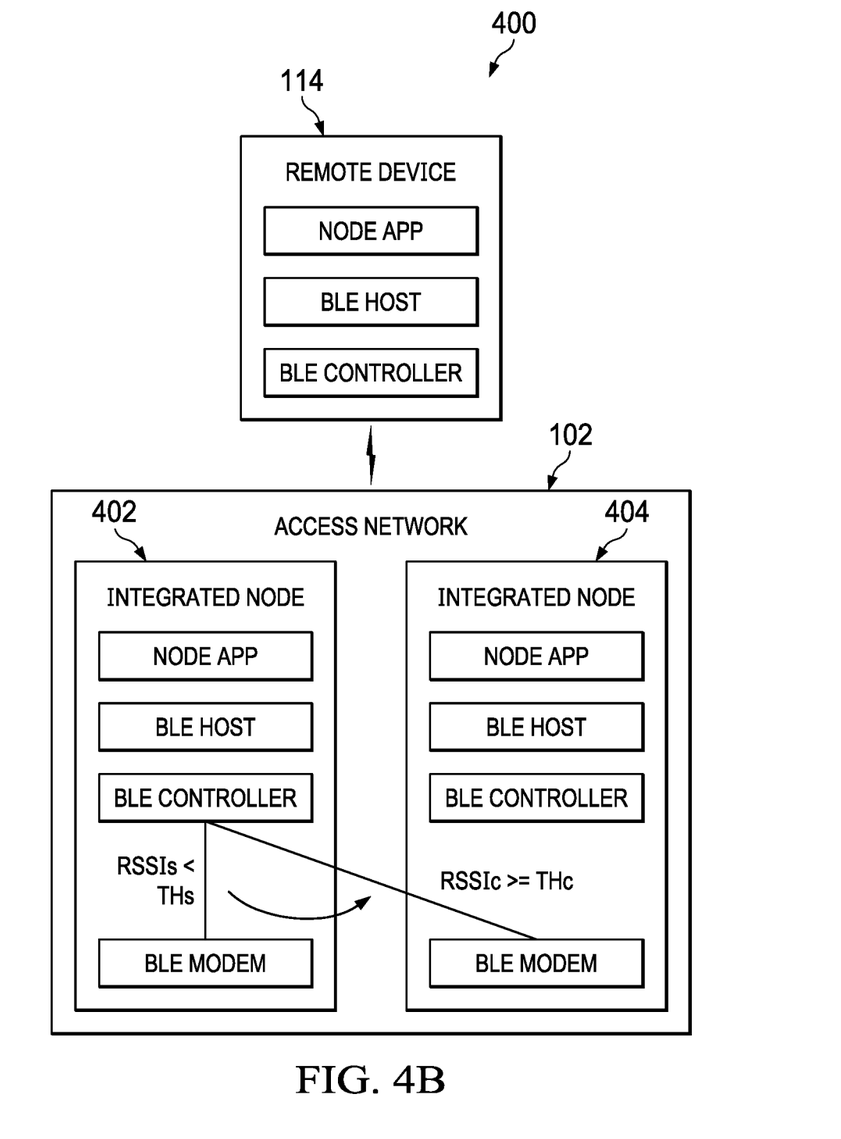

FIG. 4B is a block diagram of another system 400 for wireless communication handover in accordance with examples of this description. In FIG. 4B, the remote device 114 is as described above. The system 400 differs from the system 200 in that the access network 102 includes multiple integrated nodes 402, 404, which each includes the functionality of the stack node 112 (e.g., a node app, BLE host, and BLE controller) and the access nodes 104, 106 (e.g., modem and physical RF communication functionality) described above.

Because each integrated node 402, 404 includes stack node and access node functionality, a first connection can be formed between the node app of the integrated node 402 and the remote device 114 using the modem of the same integrated node 402. Similarly, a second connection can be formed between the node app of the integrated node 404 and the remote device 114 using the modem of the same integrated node 404. Each of these first and second connections does not consume bandwidth of the automotive/access network 102.

However, in some examples, it is determined that the link quality for a connection is less than a threshold, such as when the RSSI for the connection using the access node/modem of the integrated node 402 is less than THs. In this example, the access node/modem of the integrated node 404 is identified as a next access node to communicate with the remote device 114, because the RSSI for the access node/modem of the integrated node 404 is greater than THc. In this example, the integrated node 402 identifies the access node/modem of the integrated node 404 as a next access node, and initiates a handover procedure from the access node/modem of the integrated node 402 to the access node/modem of the integrated node 404, similar to as described above. However, the instance of the communication stack implemented by the integrated node 402 remains the same before and after the handover procedure is performed.

Accordingly, in the example of FIG. 4B, the bandwidth of the automotive/access network 102 consumed by communications between the integrated node(s) 402, 404 and the remote device 114 is reduced, such as when a connection between a node app of an integrated node 402 is using the modem of the same integrated node 402. However, the example of FIG. 4B facilitates a handover procedure between access node/modem functionality of the integrated nodes 402, 404 without the additional time and complexity introduced by an inter-stack handover.

Figure 5:
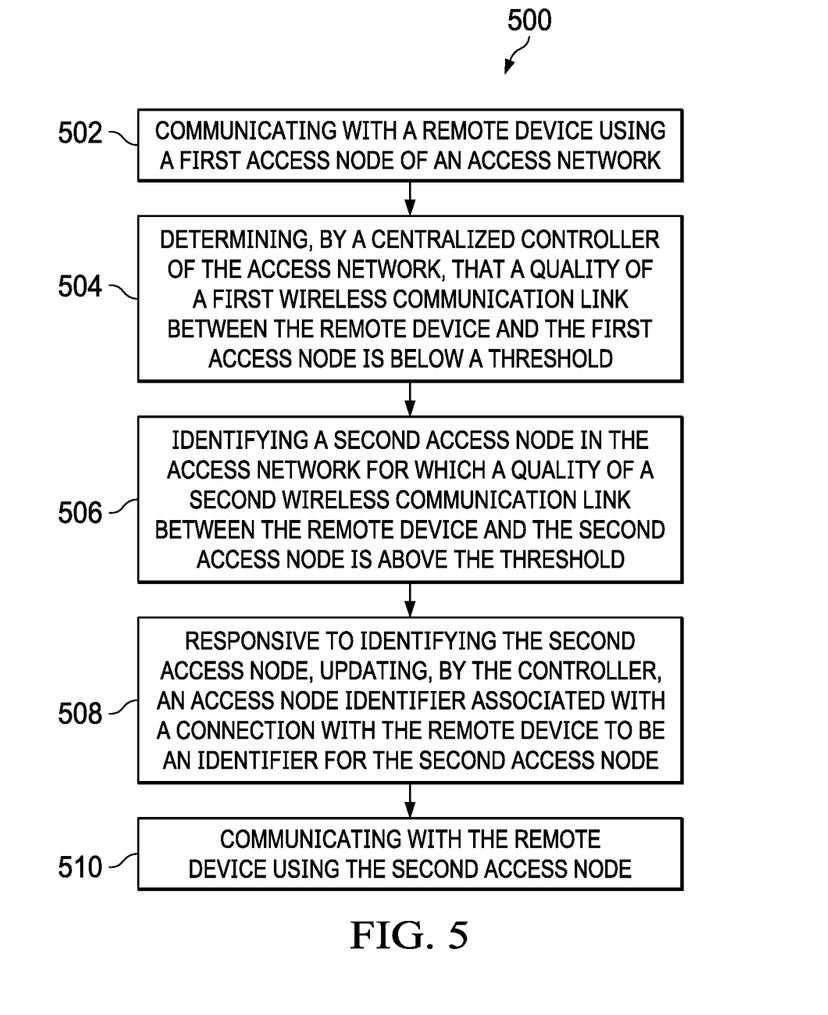
FIG. 5 is a flow chart of a method for wireless communication handover in accordance with various examples.

FIG. 5 is a flow chart of a method 500 for wireless communication handover in accordance with examples of this description. The method 500 begins in block 502 with communicating with a remote device using a first access node of an access network. For example, the BLE stack node 112 communicates with the remote device 114 using the access node 104 (e.g., the first wireless communication link 116).

The method 500 continues in block 504 with determining, by a centralized stack node of the access network (e.g., BLE stack node 112 of the access network 102), that a quality of a first wireless communication link between the remote device and the first access node is below a threshold. For example, the BLE stack node 112 determines that a link quality of the first wireless communication link 116 is less than a link quality threshold. In one example, the link quality is indicated by a RSSI value of the first wireless communication link 116, while in other examples, the link quality is indicated by a SINR value of the first wireless communication link 116.

Responsive to the BLE stack node 112 determining that the link quality of the first wireless communication link 116 is less than the link quality threshold, the BLE stack node 112 attempts to identify a different access node (e.g., a next access node, such as access node 106) that has a greater link quality than the current access node 104 to communicate with the remote device 114. The method 500 thus continues in block 506 with identifying a second access node in the access network for which a quality of a second wireless communication link between the remote device and the second access node is above the threshold.

The method 500 continues further in block 508 with, responsive to identifying the second access node, updating, by a centralized controller of the stack node, an access node identifier associated with a connection with the remote device to be an identifier for the second access node. For example, responsive to the BLE stack node 112 identifying the next access node 106, the BLE controller 204 is configured to update an access node identifier associated with a connection with the remote device 114. As described above, a connection refers to a connection between higher-level layers of the BLE communication stack implemented by the BLE stack node 112 and the remote device 114. For example, the connection between the remote device 114 and the node app 208, the BLE host 206, and/or the BLE controller 204 is the same regardless of the access node 104-110 being used to provide RF frontend and/or modem functionality for communicating with the remote device 114. In one example, the BLE controller 204 maintains a service table that associates the connection between the BLE stack node 112 and the remote device 114 with a particular access node (e.g., using a unique RF frontend identifier (ID) for that access node). In one example, the service table is stored in a memory of the stack node 112. The BLE controller 204 is configured to assign the next access node 106 to serve the connection by updating the service table. For example, the BLE controller 204 updates the RF frontend ID associated with the connection in the service table from the RF frontend ID for the previous access node 104 to the RF frontend ID for the next access node 106.

The method 500 concludes in block 510 with communicating with the remote device using the second access node. For example, subsequent communication between the BLE stack node 112 and the remote device 114 is via the access node 106 and the second wireless communication link 118. Link layer connection state context data is maintained in the centralized stack (rather than being provided to a new stack, as in the inter-stack handover described above) through the transition from serving the connection with one access node 104 to serving the connection with the next access node 106.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/− 10 percent of the stated value. Modifications are possible in the described examples, and other examples are possible within the scope of the claims.

What is claimed is:

1. A method, comprising:
communicating with a remote device using a first access node of an access network;
determining, by a centralized stack node of the access network, that a quality of a first wireless communication link between the remote device and the first access node is below a first threshold;
receiving, by the centralized stack node and from a second access node of the access network, periodic indications of a quality of a second wireless communication link between the remote device and the second access node;
responsive to the quality of the second wireless communication link being above a second threshold based on the received periodic indications, updating, by a centralized controller of the centralized stack node, an access node identifier associated with a connection with the remote device to be an identifier for the second access node; and
communicating with the remote device using the second access node.

2. The method of claim 1, further comprising:
responsive to identifying the quality of the second wireless communication link being above the second threshold, updating an entry for the connection in a service table to include the identifier for the second access node;
generating a transmit command including a data packet for transmission to the remote device; and
responsive to the entry for the connection in the service table specifying the identifier for the second access node, providing the transmit command to the second access node.

3. The method of claim 2, wherein the service table is stored in a memory of the centralized stack node.

4. The method of claim 1, further comprising:
responsive to the quality of the second wireless communication link being above the second threshold, updating an entry for the connection in a service table to include the identifier for the second access node;
generating a receive command; and
responsive to the entry for the connection in the service table specifying the identifier for the second access node, providing the receive command to the second access node.

5. The method of claim 1, further comprising implementing a communication stack on the centralized stack node, wherein an instance of the communication stack used to communicate with the remote device using the first access node is the same instance as the communication stack used to communicate with the remote device using the second access node.

6. The method of claim 5, wherein the communication stack is a Bluetooth Low Energy (BLE) communication stack, the centralized controller is a BLE controller portion of the centralized stack node, and the centralized stack node further comprises a BLE host portion.

7. The method of claim 6, further comprising implementing, by the BLE controller portion, a link layer of the BLE communication stack, wherein a physical layer of the BLE communication stack is implemented by an access node specified by an access node identifier.

8. The method of claim 6, wherein the first access node does not implement the BLE communication stack, and the second access node does not implement the BLE communication stack.

9. The method of claim 1, wherein determining that a quality of the first wireless communication link is below the first threshold further comprises receiving an indication from the first access node that the quality of the first wireless communication link is below the first threshold.

10. The method of claim 1, wherein the first access node and the centralized stack node are included in a first integrated node, and wherein the second access node is included in a second integrated node.

11. The method of claim 1, wherein the first threshold is equal to the second threshold.

12. The method of claim 1, receiving, by the centralized stack node and from a third access node of the access network, periodic indications of a quality of a third wireless communication link between the remote device and the third access node.

13. The method of claim 1, wherein the centralized stack node, the first access node, and the second access node are installed on a vehicle.

14. A system, comprising:
an access network configured to wirelessly communicate with a remote device, the access network comprising:
a first access node;
a second access node; and
a stack node coupled to the first and second access nodes, the stack node including a stack node controller configured to:
implement a communication stack to facilitate a connection with the remote device;
communicate with the remote device using a first wireless communication link between the first access node and the remote device;
receive, from the second access node, periodic indications of a quality of a second wireless communication link between the remote device and the second access node;
determine that the quality of the second wireless communication link is greater than a quality of the first wireless communication link based on the received periodic indications;
responsive to determining that the quality of the second wireless communication link is greater than the quality of the first wireless communication link, update an access node identifier associated with the connection with the remote device to be an identifier for the second access node; and
communicate with the remote device using the second access node.

15. The system of claim 14, wherein the stack node further comprises a memory configured to store a service table including an entry for the connection, and wherein the stack node is further configured to:
responsive to determining that the quality of the second wireless communication link is greater than the quality of the first wireless communication link, update the entry for the connection to include the identifier for the second access node;
generate a transmit command including a data packet for transmission to the remote device; and
responsive to the entry for the connection specifying the identifier for the second access node, provide the transmit command to the second access node.

16. The system of claim 14, wherein the stack node further comprises a memory configured to store a service table including an entry for the connection, and wherein the stack node is further configured to:
responsive to determining that the quality of the second wireless communication link is greater than the quality of the first wireless communication link, update the entry for the connection to include the identifier for the second access node;
generate a receive command; and
responsive to the entry for the connection specifying the identifier for the second access node, provide the receive command to the second access node.

17. The system of claim 14, wherein an instance of the communication stack used to communicate with the remote device using the first access node is the same instance as the communication stack used to communicate with the remote device using the second access node.

18. The system of claim 17, wherein the communication stack is a Bluetooth Low Energy (BLE) communication stack, the stack node controller is a BLE controller portion of the stack node, and the stack node further comprises a BLE host portion.

19. The system of claim 18, wherein the BLE controller portion is configured to implement a link layer of the BLE communication stack and an access node specified by the access node identifier is configured to implement a physical layer of the BLE communication stack.

20. The system of claim 14, wherein, when the stack node determines that the quality of the second wireless communication link is greater than the quality of the first wireless communication link, the stack node controller is further configured to:
receive an indication from the first access node that the quality of the first wireless communication link is below a threshold; and
receive an indication from the second access node that the quality of the second wireless communication link is above the threshold.

21. The system of claim 14, wherein, when the stack node determines that the quality of the second wireless communication link is greater than the quality of the first wireless communication link, the stack node is further configured to:
receive an indication from the first access node that the quality of the first wireless communication link is below a first threshold; and
receive an indication from the second access node that the quality of the second wireless communication link is at least a second threshold amount greater than the quality of the first wireless communication link.

22. The system of claim 14, wherein the access network comprises:
a first integrated node that includes the first access node and the stack node; and
a second integrated node that includes the second access node.

23. A device, comprising:
a first integrated node, comprising:
a first access node; and
a stack node coupled to the first access node, the stack node configured to:

implement a communication stack to facilitate a connection with a remote device;

determine that a quality of a first wireless communication link between the remote device and the first access node is below a first threshold;

receive, from a second access node in another integrated node, periodic indications of a quality of a second wireless communication link between the remote device and the second access node;

responsive to the quality of the second wireless communication link being above a second threshold based on the received periodic indications, update an access node identifier associated with a connection with the remote device to be an identifier for the second access node; and communicate with the remote device using the second access node.

24. The device of claim 23, wherein the stack node is further configured to:

responsive to the quality of the second wireless communication link being above the second threshold, update an entry for the connection in a service table to include the identifier for the second access node;

generate a transmit command including a data packet for transmission to the remote device; and responsive to the entry for the connection in the service table specifying the identifier for the second access node, provide the transmit command to the second access node.

25. The device of claim 23, wherein the stack node is further configured to:

responsive to the quality of the second wireless communication link being above the second threshold, update an entry for the connection in a service table to include the identifier for the second access node;

generate a receive command; and responsive to the entry for the connection in the service table specifying the identifier for the second access node, provide the receive command to the second access node.

* * * * *